United States Patent
Bryant et al.

(10) Patent No.: US 12,326,796 B2
(45) Date of Patent: *Jun. 10, 2025

(54) CLOUD INFRASTRUCTURE OPTIMIZATION

(71) Applicant: CAPITAL ONE SERVICES, LLC, McLean, VA (US)

(72) Inventors: Jonathan H. Bryant, McLean, VA (US); Jagadesh V. Gadiyaram, Richmond, VA (US); Thomas Caputo, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,003

(22) Filed: Nov. 30, 2023

(65) Prior Publication Data

US 2024/0232043 A1 Jul. 11, 2024

Related U.S. Application Data (63) Continuation of application No. 16/940,865, filed on Jul. 28, 2020, now Pat. No. 11,874,757, which is a continuation of application No. 16/150,825, filed on Oct. 3, 2018, now Pat. No. 10,740,208.

(51) Int. Cl.
| | | |
|---|---|---|
| *G06F 11/34* | (2006.01) | |
| *G06F 8/60* | (2018.01) | |
| *G06F 9/50* | (2006.01) | |
| *G06F 11/3668* | (2025.01) | |
| *H04L 41/0823* | (2022.01) | |

(52) U.S. Cl.
CPC ............ *G06F 11/3457* (2013.01); *G06F 8/60* (2013.01); *G06F 9/5077* (2013.01); *G06F 11/3414* (2013.01); *G06F 11/3692* (2013.01); *G06F 11/3696* (2013.01); *H04L 41/0823* (2013.01)

(58) Field of Classification Search
CPC ...... G06F 11/3457; G06F 8/60; G06F 9/5077; G06F 11/3414; G06F 11/3692; H04L 41/0823

See application file for complete search history.

(56) References Cited

U.S. PATENT DOCUMENTS

| | | |
|---|---|---|
| 6,002,871 A | 12/1999 | Duggan et al. |
| 7,813,910 B1 | 10/2010 | Poulin |
| 8,131,530 B2 | 3/2012 | Nadgir et al. |
| 8,165,862 B2 | 4/2012 | Schumacher |
| 8,392,168 B2 | 3/2013 | Samper et al. |
| 8,417,798 B2 | 4/2013 | Chen et al. |
| 8,589,140 B1 | 11/2013 | Poulin |

(Continued)

*Primary Examiner* — Chuen-Meei Gan
(74) *Attorney, Agent, or Firm* — Foley & Lardner LLP (57) ABSTRACT

A processor may receive at least one test application corresponding to an application profile. The processor may simulate the at least one test application in a non-production environment for a plurality of infrastructure configurations to generate a plurality of test performance results. The processor may evaluate the plurality of test performance results to identify an optimal infrastructure configuration from among the plurality of infrastructure configurations for the application profile. The processor may apply the optimal infrastructure configuration to an application corresponding to the application profile that is deployed in a production environment.

20 Claims, 7 Drawing Sheets

(56) References Cited

U.S. PATENT DOCUMENTS

| | | | |
|---|---|---|---|
| 8,990,062 B2* | 3/2015 | Kawahara | G06F 11/2273 |
| | | | 703/22 |
| 8,990,778 B1* | 3/2015 | Allocca | G06F 11/3692 |
| | | | 717/126 |
| 9,239,996 B2 | 1/2016 | Moorthi et al. | |
| 10,067,780 B2 | 9/2018 | Chang et al. | |
| 2004/0098242 A1 | 5/2004 | Moona et al. | |
| 2005/0086331 A1* | 4/2005 | Wadia | H04L 67/63 |
| | | | 709/224 |
| 2009/0199047 A1 | 8/2009 | Vaitheeswaran et al. | |
| 2010/0082319 A1* | 4/2010 | Cherkasova | G06F 11/3428 |
| | | | 703/22 |
| 2010/0082320 A1* | 4/2010 | Wood | G06F 11/3457 |
| | | | 718/1 |
| 2010/0198960 A1 | 8/2010 | Kirschnick et al. | |
| 2012/0239739 A1 | 9/2012 | Manglik et al. | |
| 2013/0054792 A1 | 2/2013 | Sharaf | |
| 2013/0139130 A1 | 5/2013 | Anjan | |
| 2015/0039285 A1 | 2/2015 | Qian | |
| 2015/0341229 A1 | 11/2015 | Richter et al. | |
| 2016/0140025 A1 | 5/2016 | Enright et al. | |
| 2018/0300221 A1 | 10/2018 | Barbee et al. | |
| 2018/0357099 A1* | 12/2018 | Browne | G06F 9/45504 |

* cited by examiner

CLOUD INFRASTRUCTURE OPTIMIZATION

CROSS-REFERENCE TO RELATED APPLICATIONS

This application is a continued application of U.S. Non-Provisional patent application Ser. No. 16/940,865, filed Jul. 28, 2020, which is a continued application of U.S. Non-Provisional patent application Ser. No. 16/150,825, filed Oct. 3, 2018, now U.S. Pat. No. 10,740,208, issued Aug. 11, 2020 the entire contents of which are herein incorporated by reference in their entireties.

BACKGROUND

Software is often deployed on one or more servers (e.g., in the cloud) for access by one or more client devices. The software and the deployment infrastructure handle varying workloads depending on software complexity and/or client demand, for example. Software developers often make choices on deployment infrastructure configurations without understanding how the deployment infrastructure will handle workloads to which it is subjected. This can result in unsatisfactory infrastructure and software slowdown and/or unavailability on one hand, or infrastructure overkill and waste in terms of allocation and/or cost on the other.

SUMMARY OF THE DISCLOSURE

In one example, a method of infrastructure optimization may include receiving, at a processor, at least one synthetic application corresponding to an application profile. The method may include simulating, by the processor, the at least one synthetic application in a non-production environment for a plurality of infrastructure configurations to generate a plurality of synthetic performance results. The method may include receiving, at the processor, at least one actual application. The method may include generating, by the processor, at least one test output for the at least one actual application in the non-production environment. The method may include evaluating, by the processor, the at least one test output to determine that the at least one actual application corresponds to the application profile. The method may include evaluating, by the processor, the plurality of synthetic performance results to identify an optimal infrastructure configuration from among the plurality of infrastructure configurations for the application profile. The method may include applying, by the processor, the optimal infrastructure configuration to an application corresponding to the application profile that is deployed in a production environment.

In some embodiments, the method may include generating, by the processor, the at least one synthetic application.

In some embodiments, the application profile may define a physical deployment and a workload requiring at least one of a plurality of infrastructure resources.

In some embodiments, each of the plurality of infrastructure configurations may include a different arrangement of at least one of a plurality of infrastructure resources.

In some embodiments, the evaluating of the at least one test output may include comparing the at least one test output with the plurality of synthetic performance results to determine whether the at least one test output is consistent with the synthetic performance results.

In some embodiments, the evaluating of the plurality of synthetic performance results may include selecting an infrastructure configuration yielding a highest performance from among the plurality of infrastructure configurations as the optimal infrastructure.

In some embodiments, the evaluating of the plurality of synthetic performance results may include selecting an infrastructure configuration yielding a most efficient performance from among the plurality of infrastructure configurations as the optimal infrastructure.

In another example, a method of deploying an application with an optimal infrastructure configuration may include receiving, at a processor, the application. The method may include testing, by the processor, the application in a non-production environment for at least one infrastructure configuration to generate at least one test result. The method may include comparing, by the processor, the at least one test result with a plurality of application profiles to identify a matching application profile that matches the application. The method may include determining, by the processor, an optimal infrastructure configuration for the matching application profile. The method may include causing, by the processor, the optimal infrastructure configuration to be applied for a deployment of the application in a production environment.

In some embodiments, the application profile may define a physical deployment and a workload requiring at least one of a plurality of infrastructure resources.

In some embodiments, the determining may include receiving, at the processor, at least one test application corresponding to the matching application profile. The determining may include simulating, by the processor, the at least one test application in a non-production environment for a plurality of infrastructure configurations to generate a plurality of test performance results. The determining may include evaluating, by the processor, the plurality of test performance results to identify the optimal infrastructure configuration from among the plurality of infrastructure configurations for the matching application profile.

In some embodiments, the at least one test application may include at least one synthetic application, at least one actual application, or a combination thereof. In some embodiments, the method may include generating, by the processor, the at least one synthetic application. In some embodiments, each of the plurality of infrastructure configurations may include a different arrangement of at least one of a plurality of infrastructure resources. In some embodiments, the causing may include deploying the application in the production environment.

In another example, an infrastructure optimization system may include a processor and a memory in communication with the processor. The memory may be configured to store instructions that, when executed by the processor, cause the processor to perform processing. The processing may include receiving at least one test application corresponding to an application profile. The processing may include simulating the at least one test application in a non-production environment for a plurality of infrastructure configurations to generate a plurality of test performance results. The processing may include evaluating the plurality of test performance results to identify an optimal infrastructure configuration from among the plurality of infrastructure configurations for the application profile. The processing may include applying the optimal infrastructure configuration to an application corresponding to the application profile that is deployed in a production environment.

In some embodiments, the at least one test application may include at least one synthetic application and at least one actual application. In some embodiments, the simulating may include simulating the at least one synthetic application in the non-production environment for the plurality of infrastructure configurations to generate a plurality of synthetic performance results and generating at least one test output for the at least one actual application in the non-production environment. In some embodiments, the processing may include comparing the at least one test output with the plurality of synthetic performance results to determine whether the at least one test output is consistent with the synthetic performance results.

In some embodiments, the processing may include generating the at least one synthetic application.

In some embodiments, the application profile may define a physical deployment and a workload requiring at least one of a plurality of infrastructure resources.

In some embodiments, each of the plurality of infrastructure configurations may include a different arrangement of at least one of a plurality of infrastructure resources.

DETAILED DESCRIPTION OF SEVERAL EMBODIMENTS

Embodiments described herein may build and/or utilize one or more models to optimize deployment infrastructure configurations. For example, disclosed embodiments may generate and/or test one or more synthetic applications fitting into one or more profiles against a variety of infrastructure configurations, thereby generating synthetic performance models for each profile. The synthetic performance models may determine an optimal infrastructure configuration for applications of that type. The disclosed embodiments may evaluate real applications to determine their profile matches and recommend optimal infrastructure configurations for the real applications. The real applications may therefore be deployed in efficient, yet robust, infrastructures. The disclosed modeling and recommendation procedures may allow selection and implementation of optimal infrastructure configurations with minimal testing (e.g., and therefore increased computational efficiency) per each real application deployment. Moreover, the disclosed modeling and recommendation procedures may optimize computational performance and/or efficiency during actual deployment of software in an active environment.

Figure 1:
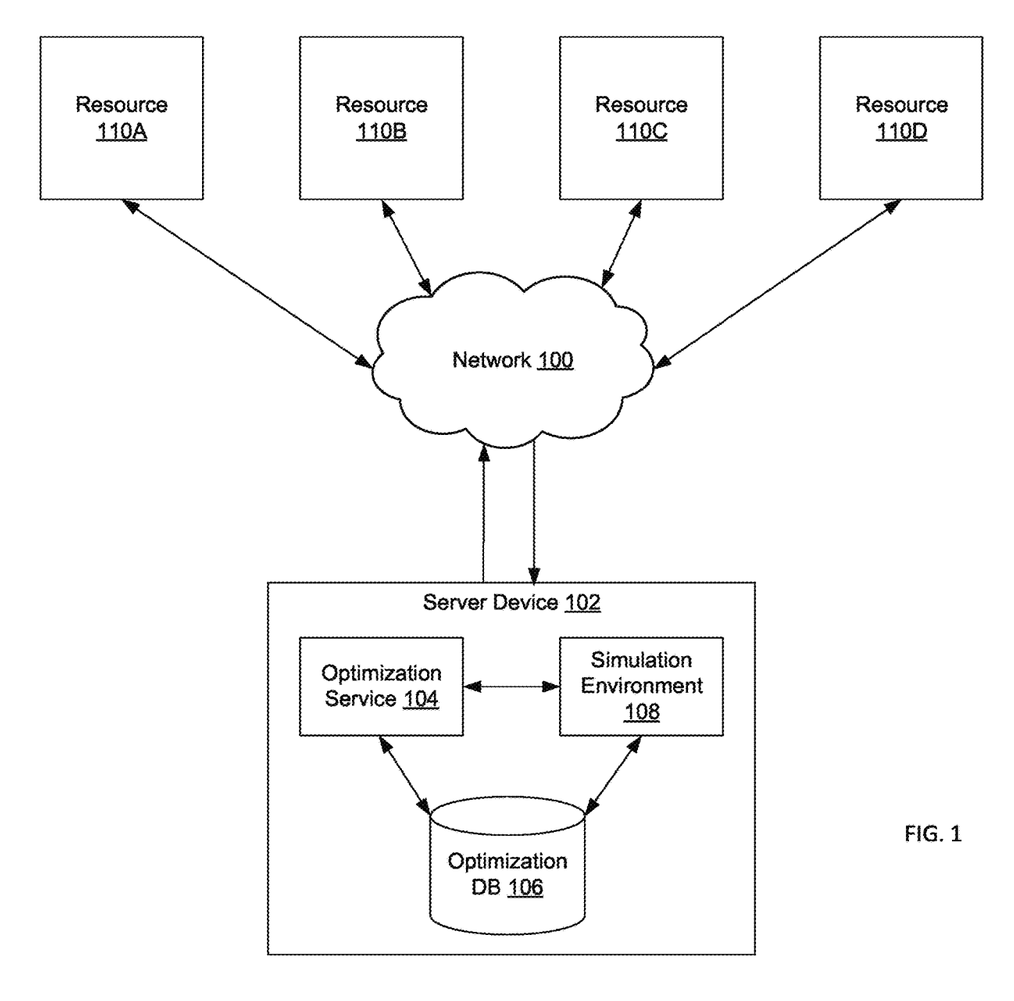
FIG. 1 shows a network according to an embodiment of the present disclosure.

FIG. 1 shows a network 100 according to an embodiment of the present disclosure. Network 100 may be the Internet and/or other public or private networks or combinations thereof. Server device 102 may communicate through network 100. One or more resources 110 may be available through network 100. Resources 110 may provide infrastructure for cloud-based applications and/or other software available to user devices and/or servers through network 100. For example, resources 110 may include cloud-based hosting and/or computing devices (e.g., Amazon Web Services™, Google Cloud Platform™, Microsoft Azure™, Heroku™, Cloud Foundry™, Docker™, etc.).

Server device 102 may be configured to determine optimal configurations of resources 110 for application deployments. Server device 102 may include optimization service 104, which may be configured to build models for application evaluation, evaluate apps, and determine the optimal configurations as described in detail below. Server device 102 may include optimization database 106, which may be configured to store information about resource 110 configurations and/or models developed by optimization service 104 as described in detail below. Server device 102 may include simulation environment 108, which may be used by optimization service 104 to simulate actual resources 110 for building models and/or for identifying models to which an application under evaluation may correspond.

Server device 102 is depicted as a single device for ease of illustration, but those of ordinary skill in the art will appreciate that server device 102 may be embodied in different forms for different implementations. For example, server device 102 may include a plurality of servers. In other examples, server device 102 may include multiple optimization services 104, optimization databases 106, and/or simulation environments 108. Moreover, four resources 110A-110D are illustrated in FIG. 1, but those of ordinary skill in the art will recognize that any number of resources 110 may be available through network 100. Resources 110 may have any configuration available in the art and may be capable of providing any deployment services available in the art and/or subsets thereof.

Figure 2:
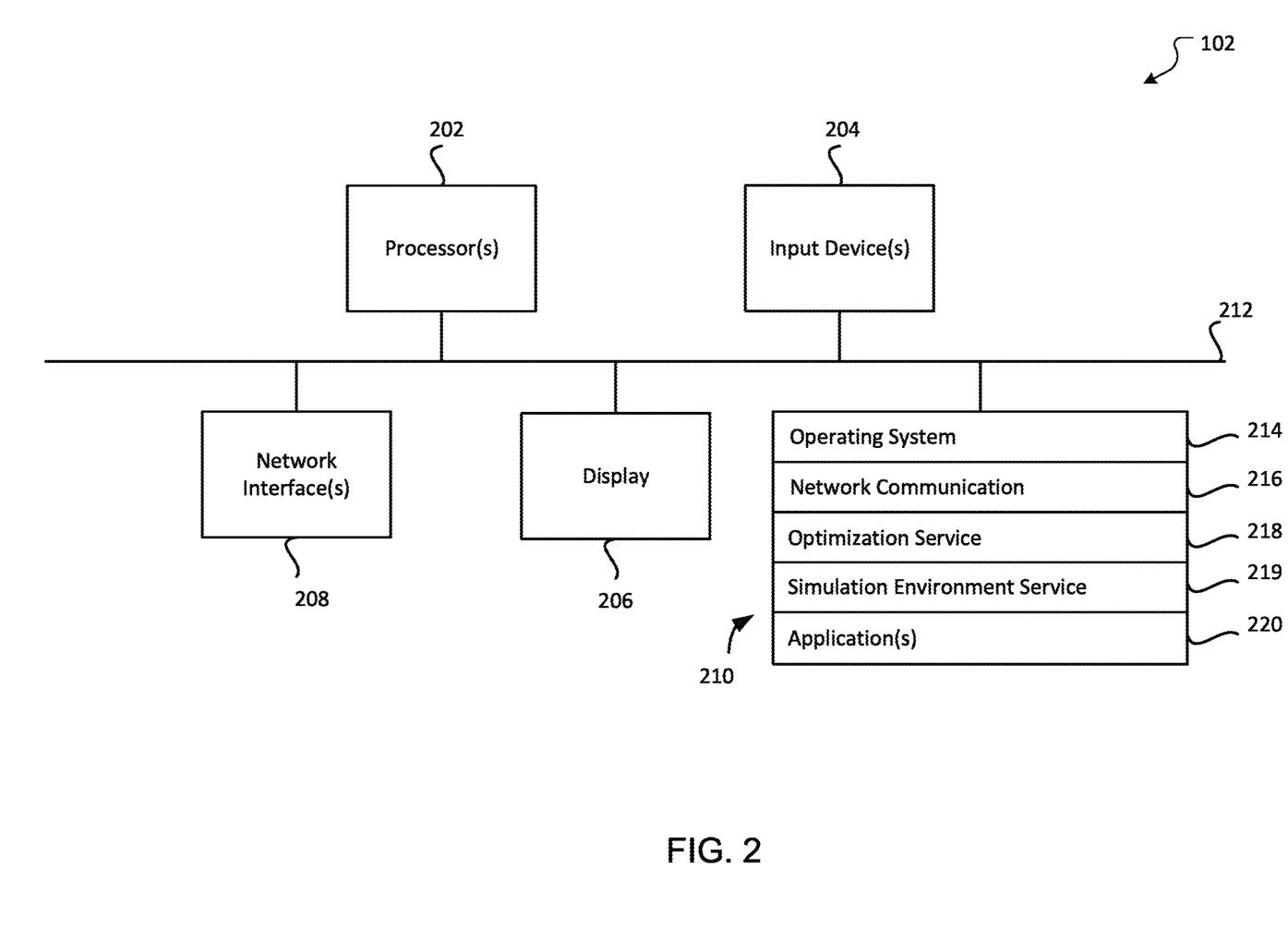
FIG. 2 shows a server device according to an embodiment of the present disclosure.

FIG. 2 shows a server device 102 according to an embodiment of the present disclosure. The server device 102 may be implemented on any electronic device that runs software applications derived from compiled instructions, including without limitation personal computers, servers, smart phones, media players, electronic tablets, game consoles, email devices, etc. In some implementations, the server device 102 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Optimization instructions 218 may include instructions that perform optimization processing as described herein. Simulation environment instructions 219 may include instructions that provide a simulation environment for the optimization processing as described herein and/or for other processing uses.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a LED (light-emitting diode) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
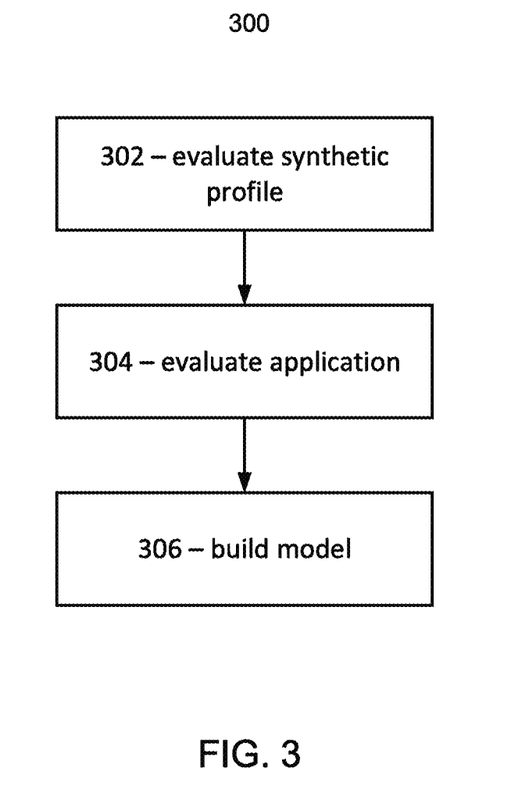
FIG. 3 shows a model building process according to an embodiment of the present disclosure.

FIG. 3 shows a model building process 300 according to an embodiment of the present disclosure. In order to determine an optimal configuration of resources 110 for a given app, optimization service 104 may evaluate the app. Rather than comparing a real app's processing and network load demands against hundreds or thousands of possible resource 110 configurations iteratively, optimization service 104 may generate one or more models and compare real applications against the models. Optimization service 104 may perform iterative processing for the models, but once the models are available, optimization service 104 may no longer need to perform iterative processing for every application under evaluation.

At 302, server device 102 may evaluate a synthetic application profile. A profile may include a combination of application features. An application feature may describe a characteristic of the application and/or a task that the application is expected to perform. Example features may include, but are not limited to, lines of code, number of bytes transferred over the network per second, quantity and size of database write operations, etc. A feature may also be a benchmark.

For example, optimization service 104 may create a synthetic application corresponding to a specific profile, test the synthetic application in simulation environment 108 against a variety of resource 110 configurations, and determine performance results. An example of this process is described with respect to FIG. 4 below.

At 304, server device 102 may evaluate one or more real applications fitting the profile. For example, optimization service 104 may identify applications similar in profile to the synthetic application, test them in simulation environment 108 against a variety of resource 110 configurations, and determine whether performance results for the real applications are similar to those of the synthetic applications. An example of this process is described with respect to FIG. 5 below.

At 306, server device 102 may build a model for the profile. For example, optimization service 104 may generate a model resource configuration that may provide optimal resource allocation for applications fitting the profile. An example of this process is described with respect to FIG. 6 below.

Figure 4:
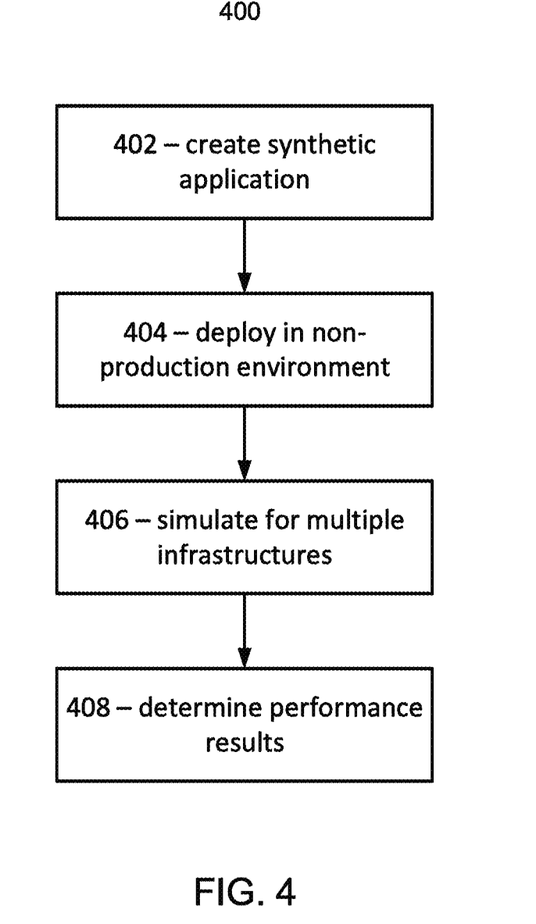
FIG. 4 shows a synthetic evaluation process according to an embodiment of the present disclosure.

FIG. 4 shows a synthetic evaluation process 400 according to an embodiment of the present disclosure. Server device 102 may perform evaluation process 400 to create and test one or more synthetic applications in a non-production environment to determine performance results that may be used to optimize resource 110 configuration for real applications similar to the synthetic applications.

At 402, server device 102 may create a synthetic application. For example, optimization service 104 may generate and/or receive profile information. Based on the profile information, optimization service 104 may generate a synthetic application structure. For example, the structure may include a database structure for the synthetic application, one or more APIs used by the synthetic application, and/or code for the synthetic application.

In some embodiments, the synthetic application may be generated from one or more benchmark tasks (e.g., described below). Benchmark tasks may be the basic building blocks of an application. They may include fundamental tasks an application performs. One or more such benchmark tasks may be able to serve as a proxy for the more complicated and/or unpredictable tasks real applications may perform.

At 404, server device 102 may deploy the synthetic application in a non-production environment. For example, optimization service 104 may deploy the synthetic application in simulation environment 108. In some embodiments, simulation environment 108 may be any application development environment providing simulation features that may be known in the art.

Simulation environment 108 may provide a scenario created to stress test an application performance as one might do during performance testing. During this stress test, the application may be given tasks to perform. The application's performance may be tested as it performs the tasks. For example, tasks may include simulating the action of a customer logging in or requesting information.

At 406, server device 102 may simulate the synthetic application for multiple resource 110 configurations. For example, resources 110 may provide publicly available benchmarks and/or proprietary benchmarks, which may include information such as resource 110 configuration (e.g., in terms of hardware and/or software) and/or capacities, response times, etc. Optimization service 104 may receive the benchmarks from resources 110 through network 100 and/or retrieve the benchmarks from optimization database 106. Based on the benchmarks, optimization service 104 may configure simulation environment 108 to simulate one or more resources 110 and test the synthetic application's operation on the simulated resources 110.

The benchmarks may be designed to test basic tasks that an application might perform. In some embodiments, a complex task may be broken into smaller benchmarks to test. In some embodiments, benchmarks may include the Google Perfkit™ benchmarks as follows:

block_storage_workload: measures disk performance (read/write latency+throughput)

cassandra_stress: benchmarks a Cassandra cluster with mixed sets of read write operations cluster_boot: measures virtual machine boot times copy_throughput: measures throughput of copies between two separate disks on a VM and across different VMs coremark: benchmarks CPU performance fio: simulates I/O workload to measure memory/disk performance and caching mechanisms hadoop_terasort: sorts data using a Hadoop cluster hpcc: a suite that measures range memory access patterns iperf: measures max bandwidth on IP networks mesh_network: runs TCP_RR, TCP_STREAM benchmarks from netperf and computes total throughput and average latency inside a mesh network mongodb_ycsb: benchmarks mongodb using YCSB engine netperf: measures performance of different types of networking, looking at unidirectional throughput and end-to-end latency object_storage_service: tests object storage services (in this case S3) performance ping: tests latency across VMs in the same zone redis: benchmarks redis speccpu2006: benchmarks CPUs sysbench: measures performance of MySQL databases on managed MySQL services (RDS+MySQL)

unixbench: holistic performance benchmark looking at CPU, memory bandwidth and disk At 408, server device 102 may determine the results of simulation at 406 to identify an optimal resource 110 configuration for the synthetic application. For example, simulation of the various resource 110 configurations within simulation environment 108 may yield performance results. Simulation may result in performance metrics related to benchmark performance (e.g., response time, latency, etc.) and/or resource utilization metrics (e.g. average/min/max CPU, memory, iops while performing the simulation, etc.). Optimization service 104 may compare the performance results from each simulation to identify at least one configuration of resources 110 giving the best performance (e.g., in terms of speed, efficiency, performance to cost ratio, or a combination thereof). Optimization service 104 may select the identified best-performing configuration as an optimal configuration for the synthetic application and, in some embodiments, store this result in optimization database 106.

Figure 5:
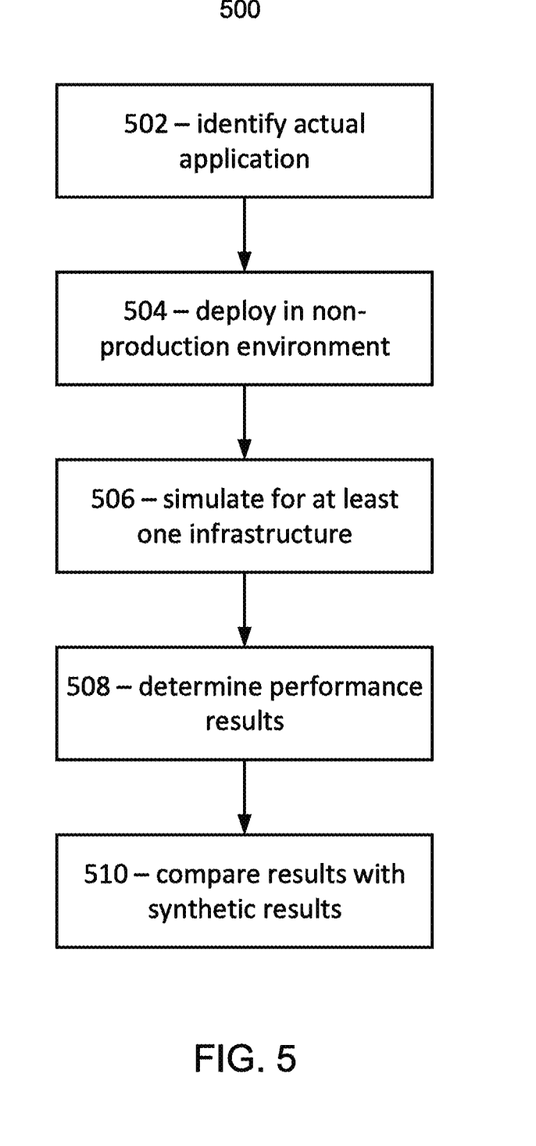
FIG. 5 shows an application evaluation process according to an embodiment of the present disclosure.

FIG. 5 shows an application evaluation process 500 according to an embodiment of the present disclosure. Server device 102 may perform evaluation process 500 to test one or more real applications in a non-production environment to determine performance results that may be used to optimize resource 110 configuration for other real applications similar to the tested application. Results from real application simulation may be checked against synthetic results from process 400 to verify and/or improve the synthetic results, for example.

At 502, server device 102 may identify an actual application for testing. For example, optimization service 104 may receive the application through network 100 and/or retrieve the application from optimization database 106. Optimization service 104 may identify the application based on its profile. For example, optimization service 104 may select an application for testing that has a same profile as the synthetic application tested in process 400.

At 504, server device 102 may deploy the identified application in a non-production environment. For example, optimization service 104 may deploy the application in simulation environment 108. In some embodiments, simulation environment 108 may be any application development environment providing simulation features that may be known in the art.

Simulation environment 108 may provide a scenario created to stress test an application performance as one might do during performance testing. During this stress test, the application may be given tasks to perform. The application's performance may be tested as it performs the tasks. For example, tasks may include simulating the action of a customer logging in or requesting information.

At 506, server device 102 may simulate the application for at least one resource 110 configurations. As noted above, resources 110 may provide publicly available benchmarks, which may include information such as resource 110 configuration (e.g., in terms of hardware and/or software) and/or capacities, response times, etc. Optimization service 104 may receive the benchmarks from resources 110 through network 100 and/or retrieve the benchmarks from optimization database 106. Based on the benchmarks, optimization service 104 may configure simulation environment 108 to simulate one or more resources 110 and test the synthetic application's operation on the simulated resources 110. For example, optimization service 104 may simulate the resource 110 configuration identified as an optimal resource 110 configuration for the profile at 408 in process 400 described above.

At 508, server device 102 may determine the results of simulation at 506. As with the synthetic simulation described above, simulation of the optimal resource 110 configuration within simulation environment 108 may yield performance results for the actual application. In some embodiments, optimization service 104 may store the results in optimization database 106.

At 510, server device 102 may compare the results of simulation determined at 508 with synthetic results from process 400. For example, optimization service 104 may perform the comparison to determine whether the application's performance with the optimal resource 110 configuration is consistent with the performance for the synthetic application. The synthetic application testing results from process 400 (and/or testing from previously executed automated performance tuning, if available) may give an initial estimate of the optimal resource configuration for an untested application. The automated performance tuning on the application in simulation environment 108 of process 500 may ensure that the application converges to the optimal resource configuration. Optimization service 104 may estimate how well the application profiling worked by how long it took to converge during performance tuning.

Figure 6:
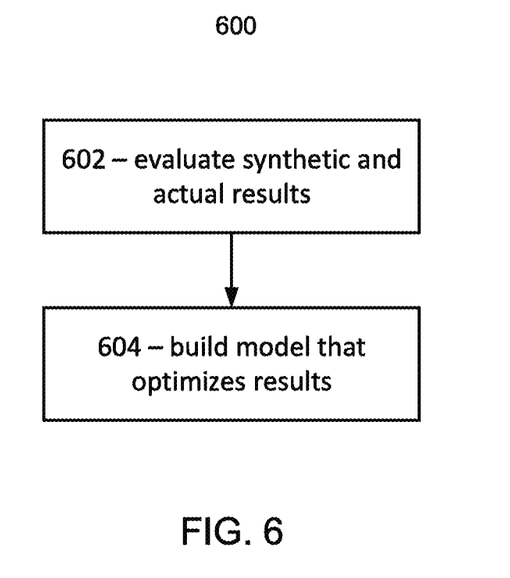
FIG. 6 shows a model building process according to an embodiment of the present disclosure.

FIG. 6 shows a model building process 600 according to an embodiment of the present disclosure. Server device 102 may build a model for a profile based on the results of process 400 and process 500. In some embodiments, the model may be used for future application deployment provisioning, for example as described below with respect to FIG. 7.

At 602, server device 102 may evaluate the results of process 400 and process 500. For example, optimization service 104 may evaluate the optimal resource 110 configuration determined from the synthetic results against the actual application's performance on the same optimal resource 110 configuration. If performance is consistent between synthetic and actual simulations, process 600 may proceed. Otherwise, optimization service 104 may repeat process 400 and/or select a different configuration from the results of processing at 406 as the optimal resource 110 configuration, and optimization service 104 may repeat process 500 for the newly selected optimal resource 110 configuration to determine whether the performance is consistent between synthetic and actual simulations.

At 604, server device 102 may build a model for the profile. For example, once an optimal resource 110 configuration with consistent results for both synthetic and actual applications is identified at 602, optimization service 104 may designate this configuration as the optimal resource 110 configuration for the model and store this configuration and/or designation in optimization database 106. The designated configuration may provide a model for deployments on network 100 as described below with respect to FIG. 7, for example.

In some embodiments, building the model with the optimal resource configuration 110 may include application profiling and/or performance tuning processing. Application profiling may include describing an application as set of features which may be used a point of comparisons. Features may include characteristics of the application (e.g. lines of code, # of commits, level of effort to develop) as well as the tasks it performs. By learning the relationship between these features and different resource configurations, optimization service 104 may be able to assign an optimal or near-optimal resource configuration to an untested application, as noted above. Optimization service 104 may learn these relationships by performing the simulations described above on synthetic applications and/or by performance tuning applications.

To perform performance tuning, applications may be stress tested prior to deployment to find optimal resource configurations. The stress testing process may be automated by optimization service 104. In some embodiments, an application team or other user(s) may select performance requirements that the application must meet (e.g. latency, requests processed per second). Optimization service 104 may perform stress testing in simulation environment 108 on the application and may collect results (e.g. the performance metrics, additional metrics such as CPU utilization, etc.). Optimization service 104 may test different resource configurations according the collected metrics, the features of the application, the cost ($) of the infrastructure, and whether or not performance requirements were met. During this process, the optimization model may be learning how features of the application and the chosen configuration relate to the performance. Information from these tests can be used to augment the application profiling model. If the featurization does not work for a particular application during performance tuning, the optimal configuration may still be able to be reached. Data from performance and other metrics (CPU, etc.) may be sufficient feedback for the reinforcement learning model to find the optimal resource configuration in some embodiments.

Figure 7:
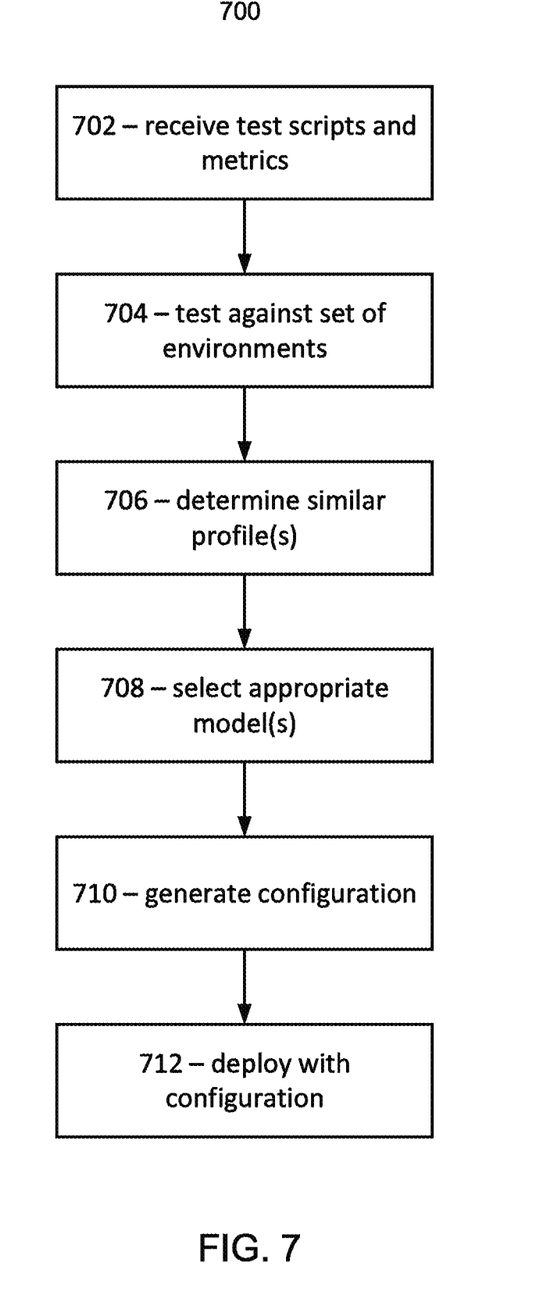
FIG. 7 shows an infrastructure optimization process according to an embodiment of the present disclosure.

FIG. 7 shows an infrastructure optimization process 700 according to an embodiment of the present disclosure. After models have been built according to the processes of FIGS. 3-6 and/or in other ways, server device 102 may use the models to deploy applications using one or more resources 110. For example, server device 102 may analyze an application to determine its profile and select a resource 110 configuration optimized for that profile when deploying the application for access via network 100.

At 702, server device 102 may receive test scripts and/or metrics for an application being evaluated for deployment.

For example, a user may submit test scrips or other application data allowing optimization service 104 to test the application within simulation environment 108. Optimization service 104 may also collect volume metrics and/or other background data that may be useful for classifying the application.

At 704, server device 102 may test the scripts against a set of test resource 110 configurations (e.g., test AWS instance types having different resource options and/or combinations thereof) within simulation environment 108. For example, optimization service 104 may select a subset of possible resource 110 configurations for testing. The selected configurations may be chosen in order to yield test results that may be indicative of which profile or profiles are most similar to the test application. In some embodiments, optimization service 104 may use a default set of configurations stored in optimization database 106. Optimization service 104 may deploy and run the test scripts against each configuration in simulation environment 108 and may collect results of the testing.

At 706, server device 102 may identify one or more profiles that may match the test application. For example, optimization service 104 may compare test results from 704 with information describing profiles stored in optimization database 106. Matches may be made at a feature level. For example, the profile of the application may include the set of features which describe it. The features may be used as points of comparisons. Each feature may have an impact on the number/type of resources required for the application. Simulated application testing as well as performance tuning of applications in the wild may be used to learn the relationships between features and resource configurations (e.g. resource requirements typical of applications with these features). Based on this processing, optimization service 104 may identify a profile that matches the test application.

At 708, server device 102 may identify a model associated with the matching profile. For example, optimization service 104 may retrieve the model developed for the profile at 604 in process 600 from optimization database 106. As described above, the model may define an optimal resource 110 configuration for the profile.

At 710, server device 102 may generate a configuration for the application that may correspond with the model. For example, optimization service 104 may retrieve the benchmarks for real resources 110 available via network 100 from optimization database 106 and/or from resources 110 themselves. Optimization service may examine the benchmarks to identify resources 110 that may correspond with the recommended resources 110 in the optimal resource 110 configuration.

At 712, server device 102 may deploy the application with the generated configuration. For example, optimization service 104 may provision resources 110 identified at 710 in any appropriate manner available in the art in order to host and/or support the application. Upon deployment, the application may be available to third-party computers through network 100. As those of ordinary skill in the art will appreciate, the deployment performed at 712 may have been achieved with minimal testing, due to the availability of predefined models that provide recommendations for resources 110 without actual testing of the application on the resources 110 themselves.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of cloud infrastructure optimization comprising:
   receiving, at a processor, at least one synthetic application corresponding to an application profile including a set of features common to applications of the application profile, the at least one synthetic application comprising executable code configured for simulated deployment in a non-production environment;
   simulating, by the processor, the at least one synthetic application in the non-production environment, the simulating comprising executing the code using a plurality of infrastructure configurations to generate a plurality of synthetic performance results, each infrastructure configuration including at least one cloud-based system used in deployment of at least one application;
   receiving, at the processor, one or more resources used by at least one actual application configured for deployment in a production environment;
   matching, by the processor, the at least one actual application with the application profile, the matching comprising determining that the one or more resources used by the actual at least one actual application correspond to one or more resource requirements of the application profile based on at least one of the plurality of synthetic performance results;
   evaluating, by the processor, the plurality of synthetic performance results to identify an optimal infrastructure configuration from among the plurality of infrastructure configurations for the application profile; and
   applying, by the processor, the optimal infrastructure configuration to an application corresponding to the application profile that is deployed in the production environment.

2. The method of claim 1, further comprising generating, by the processor, the at least one synthetic application.

3. The method of claim 1, wherein the application profile defines a physical deployment and a workload requiring at least one of a plurality of infrastructure resources.

4. The method of claim 1, wherein each of the plurality of infrastructure configurations comprises a different arrangement of at least one of a plurality of infrastructure resources.

5. The method of claim 1, wherein the one or more resource requirements of the application profile are further based on performance tuning of at least one deployed application in the production environment.

6. The method of claim 1, wherein the evaluating of the plurality of synthetic performance results comprises selecting an infrastructure configuration yielding a highest performance in at least one benchmark from among the plurality of infrastructure configurations as the optimal infrastructure.

7. The method of claim 1, wherein the evaluating of the plurality of synthetic performance results comprises selecting an infrastructure configuration yielding a most efficient performance based on at least one cost factor from among the plurality of infrastructure configurations as the optimal infrastructure.

8. A method of deploying an actual application within a cloud infrastructure with an optimal infrastructure configuration comprising:
   receiving, at a processor, one or more resources used by the actual application;
   identifying, by the processor, a matching application profile that matches the actual application from a plurality of application profiles respectively including a plurality of synthetic performance results obtained from simulating at least one synthetic application comprising executable code configured for simulated deployment in the non-production environment, the simulating comprising executing the code using a plurality of infrastructure configurations, each infrastructure configuration including at least one cloud-based system including a production environment used in deployment of at least one application, the comparing including matching the actual application with the matching application profile by determining that the one or more resources used by the actual application correspond to one or more resource requirements of the matching application profile based on at least one synthetic performance result;
   determining, by the processor, an optimal infrastructure configuration from among the plurality of infrastructure configurations for the matching application profile; and
   causing, by the processor, the optimal infrastructure configuration to be applied for a deployment of the application in the production environment.

9. The method of claim 8, wherein the application profile defines a physical deployment and a workload requiring at least one of a plurality of infrastructure resources.

10. The method of claim 8, wherein the determining comprises:
   receiving, at the processor, at least one test application corresponding to the matching application profile; and
   simulating, by the processor, the at least one test application in a non-production environment for a plurality of infrastructure configurations to generate a plurality of test performance results;
   wherein the at least one synthetic performance result is at least one of the plurality of test performance results.

11. The method of claim 10, wherein the at least one test application comprises the at least one synthetic application, at least one actual application configured for deployment within the production environment, or a combination thereof.

12. The method of claim 8, further comprising generating, by the processor, the at least one synthetic application.

13. The method of claim 10, wherein each of the plurality of infrastructure configurations comprises a different arrangement of at least one of a plurality of infrastructure resources.

14. The method of claim 10, wherein the causing comprises deploying the application in the production environment.

15. A non-transitory computer readable medium comprising instructions that, when executed by a processor, cause the processor to perform processing comprising:
   receiving at least one synthetic application corresponding to an application profile including a set of features common to applications of the application profile, the at least one synthetic application comprising executable code configured for simulated deployment in a non-production environment;
   simulating the at least one synthetic application in the non-production environment, the simulating comprising executing the code using a plurality of infrastructure configurations to generate a plurality of synthetic performance results, each infrastructure configuration including at least one cloud-based system used in deployment of at least one application;
   receiving one or more resources used by at least one actual application configured for deployment in a production environment;
   matching the at least one actual application with the application profile, the matching comprising determining that the one or more resources used by the actual at least one actual application correspond to one or more resource requirements of the application profile based on at least one of the plurality of synthetic performance results;
   evaluating the plurality of synthetic performance results to identify an optimal infrastructure configuration from among the plurality of infrastructure configurations for the application profile; and
   applying the optimal infrastructure configuration to an application corresponding to the application profile that is deployed in the production environment.

16. The non-transitory computer readable medium of claim 15,
   wherein the instructions, when executed by the processor, further cause the processor to perform processing comprising generating the at least one synthetic application.

17. The non-transitory computer readable medium of claim 15,
   wherein the application profile defines a physical deployment and a workload requiring at least one of a plurality of infrastructure resources.

18. The non-transitory computer readable medium of claim 15,
   wherein each of the plurality of infrastructure configurations comprises a different arrangement of at least one of a plurality of infrastructure resources.

19. The non-transitory computer readable medium of claim 15,
   wherein the one or more resource requirements of the application profile are further based on performance tuning of at least one deployed application in the production environment.

20. The non-transitory computer readable medium of claim 15,
   wherein the evaluating of the plurality of synthetic performance results comprises at least one of:

selecting an infrastructure configuration yielding a highest performance in at least one benchmark from among the plurality of infrastructure configurations as the optimal infrastructure; and selecting an infrastructure configuration yielding a most efficient performance based on at least one cost factor from among the plurality of infrastructure configurations as the optimal infrastructure.

* * * * *